n/a

(12) United States Patent
Ahn et al.

(10) Patent No.: US 12,255,317 B2
(45) Date of Patent: Mar. 18, 2025

(54) POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Dong Joon Ahn, Daejeon (KR); Jung Ho Lim, Daejeon (KR); Yeo June Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 685 days.

(21) Appl. No.: 17/601,526

(22) PCT Filed: Apr. 10, 2020

(86) PCT No.: PCT/KR2020/004936
§ 371 (c)(1),
(2) Date: Oct. 5, 2021

(87) PCT Pub. No.: WO2020/209685
PCT Pub. Date: Oct. 15, 2020

(65) Prior Publication Data
US 2022/0199981 A1  Jun. 23, 2022

(30) Foreign Application Priority Data
Apr. 10, 2019  (KR) .................. 10-2019-0042155

(51) Int. Cl.
| | |
|---|---|
| H01M 4/36 | (2006.01) |
| C01G 53/50 | (2025.01) |
| C09D 5/24 | (2006.01) |
| C09D 7/61 | (2018.01) |
| C09D 127/16 | (2006.01) |
| C09D 133/26 | (2006.01) |
| C09D 179/08 | (2006.01) |
| H01M 4/505 | (2010.01) |
| H01M 4/525 | (2010.01) |
| H01M 4/62 | (2006.01) |
| C08K 3/22 | (2006.01) |
| H01M 4/02 | (2006.01) |
| H01M 10/0525 | (2010.01) |

(52) U.S. Cl.
CPC ............ *H01M 4/366* (2013.01); *C01G 53/50* (2013.01); *C09D 5/24* (2013.01); *C09D 7/61* (2018.01); *C09D 127/16* (2013.01); *C09D 133/26* (2013.01); *C09D 179/08* (2013.01); *H01M 4/505* (2013.01); *H01M 4/525* (2013.01); *H01M 4/62* (2013.01); *C01P 2002/50* (2013.01); *C01P 2006/40* (2013.01); *C08K 2003/2293* (2013.01); *C08K 2201/001* (2013.01); *H01M 2004/028* (2013.01); *H01M 10/0525* (2013.01)

(58) Field of Classification Search
CPC ..................................................... H01M 4/366
See application file for complete search history.

(56) References Cited

U.S. PATENT DOCUMENTS

| | | | |
|---|---|---|---|
| 9,887,420 B2 | 2/2018 | Park et al. | |
| 11,271,198 B2 * | 3/2022 | D'Aigle | ............... H01M 4/131 |
| 2013/0101886 A1 | 4/2013 | Jung et al. | |
| 2015/0147655 A1 | 5/2015 | Park et al. | |
| 2015/0243971 A1 | 8/2015 | Cho et al. | |
| 2016/0126542 A1 | 5/2016 | Han et al. | |
| 2017/0040647 A1 | 2/2017 | Jang et al. | |
| 2017/0155151 A1 | 6/2017 | Bae et al. | |
| 2017/0170480 A1 | 6/2017 | Jang et al. | |
| 2017/0358796 A1 | 12/2017 | Kim et al. | |
| 2018/0034112 A1 | 2/2018 | Goto et al. | |
| 2018/0171063 A1 | 6/2018 | Oh et al. | |
| 2018/0294474 A1 | 10/2018 | Zhamu et al. | |
| 2018/0323436 A1 * | 11/2018 | Chen | ..................... H01M 4/624 |
| 2019/0115617 A1 * | 4/2019 | Pan | ......................... H01M 4/04 |
| 2019/0319262 A1 * | 10/2019 | Zhamu | ................. H01M 4/624 |
| 2019/0363345 A1 * | 11/2019 | Xiao | ..................... H01M 4/134 |
| 2020/0091507 A1 | 3/2020 | Zhamu et al. | |
| 2020/0127284 A1 | 4/2020 | Jang et al. | |

(Continued)

FOREIGN PATENT DOCUMENTS

| | | |
|---|---|---|
| CN | 100350652 C | 11/2007 |
| CN | 100420088 C | 9/2008 |
| CN | 103066319 A | 4/2013 |

(Continued)

OTHER PUBLICATIONS

Search Report dated Dec. 22, 23 from Office Action for Chinese Application No. 202080024996.3 issued Dec. 29, 23. 3 pgs.

(Continued)

*Primary Examiner* — Amanda C. Walke
(74) *Attorney, Agent, or Firm* — Lerner David LLP

(57) ABSTRACT

A positive electrode material for a secondary battery and a method of making the same is disclosed herein. In some embodiments, a positive electrode active material includes a lithium composite transition metal oxide including nickel (Ni), cobalt (Co), and manganese (Mn), wherein the lithium composite transition metal oxide includes 60 mol % or more of the nickel (Ni) among metals excluding lithium, and a coating layer is formed on surfaces of particles of the lithium composite transition metal oxide, wherein the coating layer includes a lithium-polymer compound which is formed by a reaction of a lithium by-product with a polymer.

13 Claims, No Drawings

(56) References Cited

U.S. PATENT DOCUMENTS

| | | | | |
|---|---|---|---|---|
| 2022/0109142 | A1* | 4/2022 | He | H01M 4/13 |
| 2023/0016756 | A1* | 1/2023 | Lim | H01M 4/131 |

FOREIGN PATENT DOCUMENTS

| | | | |
|---|---|---|---|
| CN | 106471645 | A | 3/2017 |
| CN | 107749489 | A | 3/2018 |
| CN | 108701820 | A | 10/2018 |
| JP | 2015530721 | A | 10/2015 |
| JP | 2016058191 | A | 4/2016 |
| KR | 20070008115 | A | 1/2007 |
| KR | 101490294 | B1 | 2/2015 |
| KR | 20150026864 | A | 3/2015 |
| KR | 20150049288 | A | 5/2015 |
| KR | 20150089967 | A | 8/2015 |
| KR | 20150100406 | A | 9/2015 |
| KR | 20160024777 | A | 3/2016 |
| KR | 20160083227 | A | 7/2016 |
| KR | 20170060515 | A | 6/2017 |
| KR | 20170061417 | A | 6/2017 |
| KR | 20170100289 | A | 9/2017 |
| KR | 20170109285 | A | 9/2017 |
| WO | 2014157922 | A1 | 10/2014 |
| WO | 2018191026 | A1 | 10/2018 |

OTHER PUBLICATIONS

Extended European Search Report including Written Opinion for Application No. 20788642.5 dated May 16, 2022, pp. 1-7.
International Search Report for Application No. PCT/KR2020/004936 mailed Jul. 21, 2020, pp. 1-2.

* cited by examiner

POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

The present application is a national phase entry under 35 U.S.C. § 371 of International Application No. PCT/KR2020/004936, filed on Apr. 10, 2020, which claims priority from Korean Patent Application No. 10-2019-0042155, filed on Apr. 10, 2019, the disclosures of which is are incorporated by reference herein.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide'), in which a portion of nickel (Ni) is substituted with cobalt (Co) and manganese (Mn), has been developed. However, since capacity characteristics of conventionally developed NCM-based lithium composite transition metal oxides are insufficient, the NCM-based lithium composite transition metal oxides have been limited in application.

In order to address such limitation, studies have recently been made to achieve high capacity through an increase in nickel (Ni) content in the NCM-based lithium composite transition metal oxides. However, with respect to a high-Ni positive electrode active material having a high nickel content, structural stability and chemical stability of the positive electrode active material are reduced due to a change of $Ni^{2+} \rightarrow Ni^{4+}$, and, particularly, there is a limitation in that side reactivity with the electrolyte solution is accelerated and thermal stability is rapidly reduced. Also, since a residual amount of lithium by-products present in the form of $LiOH$ and $Li_2CO_3$ on the surface of the positive electrode active material is increased as the nickel content in the positive electrode active material is increased, resulting gas generation and swelling phenomenon occur, and thus, lifetime and stability of the battery may be reduced.

Thus, there is a need to develop a high-Ni positive electrode active material having excellent surface stability, less side reaction with the electrolyte solution, a low residual amount of lithium by-products, and excellent thermal stability while meeting high capacity.

DISCLOSURE OF THE INVENTION

Technical Problem

An aspect of the present invention provides a high-nickel (Ni) positive electrode active material, in which surface stability may be improved and a side reaction with an electrolyte solution may be suppressed by forming a uniform coating layer having excellent heat resistance and mechanical strength on a surface of the high-Ni positive electrode active material, life characteristics may be improved by reducing a residual amount of lithium by-products, and excellent thermal stability may be achieved by strengthening the heat resistance, a method of preparing the same, and a positive electrode for a secondary battery and a lithium secondary battery which include the positive electrode active material.

Technical Solution

According to an aspect of the present invention, there is provided a positive electrode active material for a secondary battery which includes a lithium composite transition metal oxide including nickel (Ni), cobalt (Co), and manganese (Mn), wherein the lithium composite transition metal oxide includes 60 mol % or more of the nickel (Ni) among metals excluding lithium, and a coating layer is formed on surfaces of particles of the lithium composite transition metal oxide, wherein the coating layer includes a lithium-polymer compound which is formed by a reaction of a lithium by-product with a polymer.

According to another aspect of the present invention, there is provided a method of preparing a positive electrode active material for a secondary battery which includes preparing a lithium composite transition metal oxide which includes nickel (Ni), cobalt (Co), and manganese (Mn) and includes 60 mol % or more of the nickel (Ni) among metals excluding lithium; and forming a coating layer including a lithium-polymer compound, which is formed by a reaction of a lithium by-product present on surfaces of particles of the lithium composite transition metal oxide with a polymer, by mixing the lithium composite transition metal oxide with a polymer solution and performing a heat treatment.

According to another aspect of the present invention, there is provided a positive electrode and a lithium secondary battery which include the positive electrode active material.

Advantageous Effects

According to the present invention, a problem of reduction in structural/chemical stability and surface stability caused by an increase in nickel (Ni) of a high-Ni positive electrode active material may be improved, and a positive electrode active material having excellent thermal stability as well as high capacity may be provided. Also, a side reaction with an electrolyte solution of the high-Ni positive electrode active material may be suppressed, a residual amount of lithium by-products may be reduced, and high-temperature life characteristics may be improved.

Furthermore, since a washing process for removing the lithium by-products generated on a surface of the high-Ni positive electrode active material is not performed in the present invention, a process may be simplified and production time and processing costs may be reduced.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material of the present invention includes a lithium composite transition metal oxide including nickel (Ni), cobalt (Co), and manganese (Mn), wherein the lithium composite transition metal oxide includes 60 mol % or more of the nickel (Ni) among metals excluding lithium, and a coating layer is formed on surfaces of particles of the lithium composite transition metal oxide, wherein the coating layer includes a lithium-polymer compound which is formed by a reaction of a lithium by-product with a polymer.

The lithium composite transition metal oxide of the present invention is a high-Ni NCM-based material including nickel (Ni), cobalt (Co), and manganese (Mn), in which an amount of the nickel (Ni) among metals excluding lithium is 60 mol % or more. Preferably, the amount of the nickel (Ni) among the metals excluding lithium may be 65 mol % or more, for example, 80 mol % or more. Since the amount of the nickel (Ni) among the metals excluding lithium of the lithium composite transition metal oxide satisfies 60 mol % or more, high capacity may be secured.

Specifically, the lithium composite transition metal oxide may be represented by Formula 1 below.

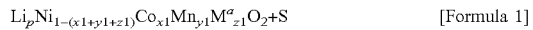

$Li_pNi_{1-(x1+y1+z1)}Co_{x1}Mn_{y1}M^a_{z1}O_{2+\delta}$ [Formula 1]

In Formula 1, $M^a$ is at least one selected from the group consisting of zirconium (Zr), tungsten (W), magnesium (Mg), aluminum (Al), cerium (Ce), hafnium (Hf), tantalum (Ta), lanthanum (La), titanium (Ti), strontium (Sr), barium (Ba), niobium (Nb), molybdenum (Mo), and chromium (Cr), $0.9 \leq p \leq 1.5$, $0 < x1 \leq 0.2$, $0 < y1 \leq 0.2$, $0 \leq z1 \leq 0.1$, $-0.1 \leq \delta \leq 1$, and $0 < x1+y1+z1 \leq 0.4$.

In the lithium composite transition metal oxide of Formula 1, lithium (Li) may be included in an amount corresponding to p, that is, $0.9 \leq p \leq 1.5$. When p is less than 0.9, capacity may be reduced, and, when p is greater than 1.5, since particles are sintered in a sintering process, the preparation of the positive electrode active material may be difficult. The Li may more preferably be included in an amount satisfying $1.0 \leq p \leq 1.15$, in consideration of balance between a significant capacity characteristics improvement effect of the positive electrode active material and sinterability during the preparation of the active material due to the control of the amount of the Li.

In the lithium composite transition metal oxide of Formula 1, Ni may be included in an amount corresponding to $1-(x1+y1+z1)$, for example, $0.60 \leq 1-(x1+y1+z1) < 1$. If the amount of the Ni in the lithium composite transition metal oxide of Formula 1 is 0.60 or more, since the amount of the Ni, which is sufficient to contribute to charge and discharge, is secured, high capacity may be achieved. The Ni may more preferably be included in an amount satisfying $0.65 \leq 1-(x1+y1+z1) \leq 0.99$.

In the lithium composite transition metal oxide of Formula 1, Co may be included in an amount corresponding to x1, that is, $0 < x1 \leq 0.2$. In a case in which the amount of the Co in the lithium composite transition metal oxide of Formula 1 is greater than 0.2, there is a concern that cost may increase. The Co may specifically be included in an amount satisfying $0.05 < x1 \leq 0.2$ in consideration of a significant capacity characteristics improvement effect due to the inclusion of the Co.

In the lithium composite transition metal oxide of Formula 1, Mn may be included in an amount corresponding to y1, that is, $0 < y1 \leq 0.2$ in consideration of a life characteristics improvement effect. If y1 in the lithium composite transition metal oxide of Formula 1 is greater than 0.2, there is a concern that output characteristics and capacity characteristics of a battery may be degraded, and the Mn may specifically be included in an amount satisfying $0.05 \leq y1 \leq 0.2$.

In the lithium composite transition metal oxide of Formula 1, $M^a$ may be a doping element included in a crystal structure of the lithium composite transition metal oxide, wherein the $M^a$ may be included in an amount corresponding to z1, that is, $0 \leq z1 \leq 0.1$.

With respect to a high-Ni NCM-based positive electrode active material in which an amount of nickel (Ni) among metals excluding lithium is 60 mol % or more, as the lithium composite transition metal oxide of the present invention, structural stability and chemical stability of the positive electrode active material are reduced due to a change in the oxidation number of nickel (Ni), and, particularly, there is a limitation in that side reactivity with an electrolyte solution is accelerated and thermal stability is rapidly reduced. Also, since a residual amount of lithium by-products present in the form of LiOH and $Li_2CO_3$ on a surface of the positive electrode active material is increased as the nickel content in the positive electrode active material is increased, resulting gas generation and swelling phenomenon occur, and thus, there is also a limitation in that lifetime and stability of the battery may be reduced.

Thus, typically, surfaces of high-Ni lithium composite transition metal oxide particles were coated with a metal oxide system, but there was a limitation in forming a uniform coating layer only by mixing and heat treatment of the metal oxide in the form of powder. The non-uniform coating layer on the surface of the positive electrode active material had a limitation in that lifetime was reduced and cell resistance was increased due to side reaction products caused by a side reaction with the electrolyte solution in a charge and discharge process in which intercalation and deintercalation of lithium (Li) are repeated.

In order to address the above-described limitations, a uniform coating layer having excellent heat resistance and mechanical strength is formed on the surfaces of the high-Ni lithium composite transition metal oxide particles in the present invention so that surface stability is improved, the side reaction with the electrolyte solution is suppressed, the life characteristics may be improved by reducing the residual amount of the lithium by-products, and excellent thermal stability may be achieved by strengthening the heat resistance.

The coating layer includes a lithium-polymer compound which is formed by a reaction of a lithium by-product with a polymer.

In general, LiOH and $Li_2CO_3$, lithium by-products, cause a volume expansion of a cell by generating CO or $CO_2$ gas due to the side reaction with the electrolyte solution in a charge and discharge process, but, in the present invention, the lithium by-product reduces the side reactivity with the electrolyte solution by forming the lithium-polymer compound, in which lithium ions are bonded to the polymer through the reaction with the polymer as a surface coating material, and may contribute to improving battery performance.

The polymer may include at least one selected from the group consisting of polyacrylamide (PAA) and polyimide (PI). That is, the coating layer of the present invention may include a $Li^+$-PAA and/or $Li^+$-PI compound. The polyacrylamide (PAA) and/or polyimide (PI) is used as the polymer of the coating layer so that heat resistance, chemical resistance, and mechanical strength may be improved, the life characteristics may be improved by suppressing the side reaction with the electrolyte solution, and the thermal stability may be improved by strengthening the heat resistance.

The lithium by-product may include at least one selected from the group consisting of LiOH and $Li_2CO_3$. The lithium by-product is formed on the surfaces of the high-Ni lithium composite transition metal oxide particles, wherein, if the residual amount of the lithium by-product is increased, since the gas generation and swelling phenomenon occur to reduce the lifetime and stability of the battery, a washing process for removing the lithium by-product is typically performed during the preparation of the high-Ni NCM-based positive electrode active material. However, with respect to the present invention, since the lithium by-product is not removed, but the polymer coating treatment is performed, a coating layer including the lithium-polymer compound, which is formed by the reaction of the lithium by-product with the polymer, is formed. The lithium-polymer compound included in the coating layer may suppress a reduction in ionic and electrical conductivities which may occur due to polymer coating and may improve the ionic and electrical conductivities.

According to an embodiment of the present invention, the lithium by-product includes LiOH and $Li_2CO_3$, wherein $Li_2CO_3$/LiOH may be in a range of 0.1 to 1.0, preferably 0.13 to 0.98, and more preferably 0.15 to 0.96. In the positive electrode active material of the present invention, since a content ratio of $Li_2CO_3$ to LiOH is changed in a process of forming the coating layer, the $Li_2CO_3$/LiOH may satisfy 0.1 to 1.0. Since the $Li_2CO_3$/LiOH satisfies 0.1 to 1.0, there is an effect of excellent capacity retention and low resistance increase rate.

Also, according to an embodiment of the present invention, a total amount of the lithium by-product remaining in the positive electrode active material may be in a range of 0.5 wt % to 2.0 wt %, preferably 0.7 wt % to 1.5 wt %, and more preferably 0.8 wt % to 1.25 wt %. Since the total amount of the lithium by-product remaining in the positive electrode active material satisfies the above weight range, the side reaction with the electrolyte solution and the resulting gas generation and cell swelling phenomenon are reduced, and thus, long-term lifetime may be improved, vent due to an increase in cell volume may be prevented, and safety may be improved.

Also, the coating layer may further include a metal oxide. The metal oxide may include at least one selected from the group consisting of boron (B), Co, Zr, Al, and Nb. Since the coating layer further includes the metal oxide, the coating layer may have a low initial resistance value and may exhibit excellent capacity retention and a low resistance increase rate.

<Method of Preparing Positive Electrode Active Material>

A method of preparing a positive electrode active material of the present invention includes the steps of: preparing a lithium composite transition metal oxide which includes nickel (Ni), cobalt (Co), and manganese (Mn) and includes 60 mol % or more of the nickel (Ni) among metals excluding lithium; and forming a coating layer including a lithium-polymer compound, which is formed by a reaction of a lithium by-product present on surfaces of particles of the lithium composite transition metal oxide with a polymer, by mixing the lithium composite transition metal oxide with a polymer solution and performing a heat treatment.

The method of preparing a positive electrode active material of the present invention will be described in detail for each step below.

First, a lithium composite transition metal oxide, which includes nickel (Ni), cobalt (Co), and manganese (Mn) and includes 60 mol % or more of the nickel (Ni) among metals excluding lithium, is prepared.

That previously described in the positive electrode active material is equally applied to the lithium composite transition metal oxide.

Next, the lithium composite transition metal oxide is mixed with a polymer solution and a heat treatment is performed to form a coating layer including a lithium-polymer compound which is formed by a reaction of a lithium by-product present on surfaces of particles of the lithium composite transition metal oxide with a polymer.

The polymer solution may include an organic solvent and at least one polymer selected from the group consisting of polyacrylamide (PAA) and polyimide (PI). The organic solvent may include at least one selected from the group consisting of isopropyl alcohol, ethanol, hexane, and N-methylpyrrolidone (NMP). With respect to the present invention, liquid-phase coating may be performed by using the polymer solution including the organic solvent rather than a coating material in the form of powder when forming the coating layer. Subsequently, a uniform coating layer may be formed on the surfaces of the lithium composite transition metal oxide particles by evaporating the organic solvent through a drying process.

With respect to an embodiment of the present invention, a washing process for removing the lithium by-product of the lithium composite transition metal oxide may not be included before the formation of the coating layer after the preparation of the lithium composite transition metal oxide. The lithium by-product may include at least one selected from the group consisting of LiOH and $Li_2CO_3$. Since the lithium by-product remaining on the surfaces of the high-Ni lithium composite transition metal oxide particles reacts with the polymer to form the lithium-polymer compound, the lithium by-product may improve resistance characteristics and may play a role in improving the ionic and electrical conductivities. Also, since the washing process for removing the lithium by-product may not be separately performed, a process may be simplified and production time and processing costs may be reduced.

The heat treatment may be performed at a temperature of 100° C. to 500° C., preferably 200° C. to 400° C., and more preferably 250° C. to 380° C. Also, the heat treatment may be performed in an air atmosphere, and may be performed for 3 hours to 5 hours.

<Positive Electrode and Secondary Battery>

According to another embodiment of the present invention, provided are a positive electrode for a lithium secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\alpha$ ($0<\alpha<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Lithium hydroxide (LiOH) was added to a precursor, in which a molar ratio of Ni:Co:Mn was 90:4:6, such that a molar ratio of Li/Metal(Ni,Co,Mn) became 1.01 and mixed, and the mixed powder was introduced into an alumina crucible for a heat treatment. Thereafter, the heat treatment was performed at 750° C. for 5 hours in an oxygen atmosphere, and was subsequently performed at 870° C. for 10 hours to prepare a lithium composite transition metal oxide.

Thereafter, lithium composite transition metal oxide powder after the completion of the heat treatment was ground using a mortar, and the lithium composite transition metal oxide and a polymer solution of polyacrylamide (PAA) dissolved in organic solvent NMP were mixed. The mixed mixture was heat-treated at 300° C. for 5 hours in an air atmosphere to prepare a positive electrode active material on which a coating layer including lithium-polyacrylamide (PAA) was formed.

Example 2

A positive electrode active material was prepared in the same manner as in Example 1 except that polyimide (PI) was used as a polymer instead of the polyacrylamide (PAA).

Example 3

A positive electrode active material was prepared in the same manner as in Example 1 except that metal oxide $H_3BO_3$ was further mixed when the lithium composite transition metal oxide and the polyacrylamide (PAA) were mixed.

Example 4

A positive electrode active material was prepared in the same manner as in Example 1 except that polyvinylidene fluoride (PVDF) was used as a polymer instead of the polyacrylamide (PAA).

Comparative Example 1

A positive electrode active material was prepared in the same manner as in Example 1 except that, before the mixing of the lithium composite transition metal oxide powder after the completion of the heat treatment with the polymer solution, a ratio of solid content to de-ionized water was set to 1:1.2 to perform a washing process, and dry coating was performed after mixing metal oxide $H_3BO_3$ powder instead of the polymer solution of polyacrylamide (PAA) dissolved in organic solvent NMP.

Comparative Example 2

A positive electrode active material was prepared in the same manner as in Example 1 except that, before the mixing of the lithium composite transition metal oxide powder after the completion of the heat treatment with the polymer solution, a ratio of solid content to de-ionized water was set to 1:1.2 to perform a washing process.

Experimental Example 1: Measurement of $Li_2CO_3$/LiOH in Coating Layer

After 5 g of each of the positive electrode active materials prepared in Examples 1 to 4 and Comparative Examples 1 and 2 was dispersed in 100 mL of water, a change in pH was measured while the solution was titrated with 0.1 M HCl to obtain a pH titration curve. An amount of LiOH and an amount of $Li_2CO_3$ in the coating layer of each positive electrode active material were calculated by using the pH titration curve, and a $Li_2CO_3$/LiOH value was evaluated and presented in Table 1 below.

TABLE 1

|  | LiOH amount (wt %) | $Li_2CO_3$ amount (wt %) | Total lithium by-products amount (wt %) | $Li_2CO_3$/LiOH |
|---|---|---|---|---|
| Example 1 | 0.588 | 0.561 | 1.149 | 0.954 |
| Example 2 | 0.978 | 0.153 | 1.131 | 0.156 |
| Example 3 | 0.756 | 0.490 | 1.246 | 0.648 |
| Example 4 | 0.358 | 0.621 | 0.979 | 1.734 |
| Comparative Example 1 | 0.278 | 0.500 | 0.778 | 1.799 |
| Comparative Example 2 | 0.347 | 0.759 | 1.106 | 2.187 |

Referring to Table 1, with respect to Examples 1 to 3 in which the washing process was not performed and the coating layer including a lithium-polymer compound was formed by using the polymer solution of polyacrylamide (PAA) or polyimide (PI), the $Li_2CO_3$/LiOH values were 1.0 or less, but Comparative Example 1, in which the dry coating was performed after washing, and Comparative Example 2, in which the polymer coating was performed after washing, exhibited high values of 1.799 and 2.187, respectively. With respect to Example 4 in which the polyvinylidene fluoride (PVDF) was used instead of the polyacrylamide (PAA), the $Li_2CO_3$/LiOH value was high at 1.734.

Experimental Example 2: Thermal Stability (DSC) Evaluation

A heat flow according to the temperature was measured for the positive electrode active materials of Examples 1 to 4 and Comparative Examples 1 and 2 using a differential scanning calorimeter (Sensys evo DSC, SETARAM Instrumentation). Specifically, 16 mg of each of the positive electrode active materials of Examples 1 to 4 and Comparative Examples 1 and 2 was put in a pressure-resistant pan for DSC measurement and 20 μL of an electrolyte solution (EVPS) was then injected. A temperature range for DSC analysis was set at 25° C. to 400° C., and a heating rate was set at 10° C./min. DSC measurement was performed more than three times on each of the positive electrode active materials to calculate an average value. Measurement results are presented in Table 2.

TABLE 2

|  | Main peak (° C.) |
|---|---|
| Example 1 | 235 |
| Example 2 | 240 |

TABLE 2-continued

| | Main peak (° C.) |
|---|---|
| Example 3 | 243 |
| Example 4 | 229 |
| Comparative Example 1 | 230 |
| Comparative Example 2 | 228 |

Referring to Table 2, Examples 1 to 3 had significantly better thermal stabilities than Comparative Examples 1 and 2. Also, Examples 1 to 3 had better thermal stabilities than Example 4. The reason for this is considered that, with respect to Examples 1 to 3, the thermal stabilities were improved by the lithium-polymer compound which was formed in the coating process using the polymer solution of polyacrylamide (PAA) or polyimide (PI).

Experimental Example 3: Battery Performance Evaluation

Each of the positive electrode active materials prepared in Examples 1 to 4 and Comparative Examples 1 and 2, a carbon black conductive agent, and a PVdF binder were mixed in an N-methylpyrrolidone solvent at a weight ratio of 96.5:1.5:2 to prepare a positive electrode material mixture (viscosity: 5,000 mPa·s), and one surface of an aluminum current collector was coated with the positive electrode material mixture, dried at 130° C., and then rolled to prepare a positive electrode.

Natural graphite as a negative electrode active material, a carbon black conductive agent, and a PVdF binder were mixed in an N-methylpyrrolidone solvent at a weight ratio of 85:10:5 to prepare a composition for forming a negative electrode, and one surface of a copper current collector was coated with the composition to prepare a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Each of the lithium secondary batteries prepared as in the preparation example by using each of the positive electrode active materials of Examples 1 to 4 and Comparative Examples 1 and 2 was charged at 0.33 C to a voltage of 4.25 V in a constant current/constant voltage (CCCV) mode at 45° C. (termination current of 0.05 C) and discharged at a constant current of 0.33 C to a voltage of 2.5 V to measure capacity retention [%] and a resistance increase rate (DCR Increase [%]) when 30 cycles of charge and discharge were performed, and the results thereof are presented in Table 3.

TABLE 3

| | Capacity retention (%) | Initial resistance (Ω) | Resistance increase rate (%) |
|---|---|---|---|
| Example 1 | 94.9 | 18.3 | 119.5 |
| Example 2 | 94.5 | 19.1 | 147.8 |
| Example 3 | 96.1 | 18.1 | 121.7 |
| Example 4 | 93.9 | 22.7 | 165.6 |
| Comparative Example 1 | 94.8 | 21.7 | 152.9 |
| Comparative Example 2 | 92.7 | 25.3 | 168.9 |

Referring to Table 3, with respect to Examples 1 to 3, capacity retentions were improved in comparison to that of Comparative Example 2, and it may be confirmed that, with respect to Examples 1 to 3, initial resistances were reduced and resistance increase rates were also reduced in comparison to those of Comparative Examples 1 and 2. With respect to Example 4, an effect of improving capacity retention and resistance characteristics was reduced.

The invention claimed is:

1. A positive electrode active material for a secondary battery, the positive electrode active material comprising a lithium composite transition metal oxide including nickel (Ni), cobalt (Co), and manganese (Mn), wherein the lithium composite transition metal oxide comprises 60 mol % or more of the nickel (Ni) among metals excluding lithium, and
a coating layer formed on surfaces of particles of the lithium composite transition metal oxide, wherein the coating layer comprises a lithium-polymer compound which is formed by a reaction of a lithium by-product with a polymer,
wherein the lithium by-product comprises at least one selected from the group consisting of LiOH and $Li_2CO_3$.

2. The positive electrode active material for a secondary battery of claim 1, wherein the polymer comprises at least one selected from the group consisting of polyacrylamide (PAA) and polyimide (PI).

3. The positive electrode active material for a secondary battery of claim 1, wherein the lithium by-product comprises LiOH and $Li_2CO_3$, wherein a weight ratio of $Li_2CO_3$ to LiOH is in a range of 0.1 to 1.0.

4. The positive electrode active material for a secondary battery of claim 1, comprising the lithium by-product, wherein a total amount of the lithium by-product in the positive electrode active material is in a range of 0.5 wt % to 2.0 wt %.

5. The positive electrode active material for a secondary battery of claim 1, wherein the coating layer further comprises a metal oxide.

6. The positive electrode active material for a secondary battery of claim 5, wherein the metal oxide comprises at least one selected from the group consisting of boron (B), cobalt (Co), zirconium (Zr), aluminum (Al), and niobium (Nb).

7. A method of preparing a positive electrode active material for a secondary battery of claim 1, the method comprising:
mixing a lithium composite transition metal oxide and a polymer solution comprising a polymer; and
heat treating the mixture to form coating layer on a surface of the lithium composite transition metal oxide, wherein the coating layer is formed by a reaction of a lithium by-product present on a surface of the lithium composite transition metal oxide and the polymer, and
wherein the lithium composite transition metal oxide which comprises nickel (Ni), cobalt (Co), and manganese (Mn) and comprises 60 mol % or more of the nickel (Ni) among metals excluding lithium.

8. The method of claim 7, wherein the polymer solution comprises an organic solvent and at least one polymer selected from the group consisting of polyacrylamide (PAA) and polyimide (PI).

9. The method of claim 7, wherein the lithium by-product comprises at least one selected from the group consisting of LiOH and $Li_2CO_3$.

10. The method of claim 7, wherein a washing process for removing the lithium by-product of the lithium composite transition metal oxide is not included.

11. The method of claim 7, wherein a temperature of the heat treatment is in a range of 100° C. to 500° C.

12. A positive electrode for a secondary battery, the positive electrode comprising the positive electrode active material of claim 1.

13. A lithium secondary battery comprising the positive electrode of claim 12.

* * * * *